(12) United States Patent
Pan

(10) Patent No.: US 10,480,691 B2
(45) Date of Patent: Nov. 19, 2019

(54) WATER PIPE

(71) Applicant: X. J. ELECTRICS (HUBEI) CO., LTD., Huanggang, Hubei (CN)

(72) Inventor: Yun Pan, Hubei (CN)

(73) Assignee: X.J. ELECTRICS (HUBEI) CO., LTD., Huanggang, Hubei (CN)

( * ) Notice: Subject to any disclaimer, the term of this patent is extended or adjusted under 35 U.S.C. 154(b) by 22 days.

(21) Appl. No.: 15/762,584

(22) PCT Filed: Feb. 8, 2018

(86) PCT No.: PCT/CN2018/075801
§ 371 (c)(1),
(2) Date: Mar. 23, 2018

(87) PCT Pub. No.: WO2019/153179
PCT Pub. Date: Aug. 15, 2019

(65) Prior Publication Data
US 2019/0242502 A1    Aug. 8, 2019

(51) Int. Cl.
*F16L 11/12* (2006.01)
*F16L 11/00* (2006.01)
*F16L 33/22* (2006.01)
*F16L 33/01* (2006.01)
*F16L 11/115* (2006.01)

(52) U.S. Cl.
CPC .............. *F16L 11/12* (2013.01); *F16L 11/005* (2013.01); *F16L 11/115* (2013.01); *F16L 33/01* (2013.01); *F16L 33/223* (2013.01)

(58) Field of Classification Search
CPC ........ F16L 11/12; F16L 11/005; F16L 11/115; F16L 33/01; F16L 33/223

USPC ......................................................... 138/137
See application file for complete search history.

(56) References Cited

U.S. PATENT DOCUMENTS

| 2002/0073612 | A1* | 6/2002 | Motai | C10B 53/08 44/580 |
| 2005/0224126 | A1* | 10/2005 | Otani | F16L 58/04 138/137 |
| 2012/0132578 | A1* | 5/2012 | Yoshinobu | C02F 1/283 210/282 |
| 2013/0213514 | A1* | 8/2013 | Berardi | F16L 11/00 138/109 |

(Continued)

FOREIGN PATENT DOCUMENTS

CN         104726995 B   *   8/2016

*Primary Examiner* — Craig M Schneider
*Assistant Examiner* — David R Deal
(74) *Attorney, Agent, or Firm* — Rankin, Hill & Clark LLP

(57) ABSTRACT

A water pipe includes a pipe body (1), a woven layer (2) sleeved around the pipe body (1), a first joint assembly (3) arranged at one end of the pipe body (1) and secured to the pipe body (1), and a second joint assembly (4) arranged at another end of the pipe body (1) and secured to the pipe body (1); the woven layer (2) includes bamboo charcoal fibers and polypropylene filaments. The woven layer (2) is sleeved around the pipe body (1) and is not connected with the pipe body (1), and the woven layer (2) includes bamboo charcoal fibers and polypropylene filaments. Bamboo charcoal fibers have the functions of resisting bacteria and removing peculiar smell and can effectively prevent the generation of bacteria on the water pipe and the emission of peculiar smell when the water pipe is used in humid outdoor environments.

11 Claims, 3 Drawing Sheets

(56) References Cited

U.S. PATENT DOCUMENTS

| | | | |
|---|---|---|---|
| 2014/0034072 A1* | 2/2014 | Robertson | A24D 3/0229 |
| | | | 131/341 |
| 2014/0120322 A1* | 5/2014 | Fu | D04H 1/4242 |
| | | | 428/176 |
| 2015/0079350 A1* | 3/2015 | Tanaka | F16L 5/04 |
| | | | 428/169 |
| 2015/0266751 A1* | 9/2015 | Arita | B01J 20/28011 |
| | | | 210/287 |
| 2016/0089616 A1* | 3/2016 | Maruyama | B01D 5/0033 |
| | | | 165/104.21 |
| 2016/0245451 A1* | 8/2016 | Okada | C09K 21/02 |
| 2017/0057832 A1* | 3/2017 | Wilkie | C02F 1/004 |

\* cited by examiner

WATER PIPE

TECHNICAL FIELD

The present application relates to the technical field of household appliance, and more particularly relates to a water pipe.

BACKGROUND

At present, with improvement of the living condition, more and more families have family courtyards, and generally, a family courtyard is provided therein with ornamental plants such as lawns and flowers. In order to ensure that the ornamental plants in the courtyard can well grow, it is need to provide necessary moisture for the ornamental plants, and generally, water pipes are used for irrigating the ornamental plants.

Due to use in a courtyard, a water pipe is placed outdoors for a long time and is in a humid environment, bacteria and peculiar smell are prone to be formed on its surface, causing not only the use experience deteriorated, but also facilitating bacteria propagation.

SUMMARY

An object of the present application is to provide a water pipe which can overcome the problem of the prior art that the bacteria are easily bred on the surface of a water pipe.

In order to achieve the aforementioned object, the present application provides a water pipe as follows.

A water pipe comprising:
a pipe body;
a woven layer including bamboo charcoal fibers and polypropylene filaments and sleeved around the pipe body;
a first joint assembly arranged at one end of the pipe body and secured to the pipe body; and
a second joint assembly arranged at another end of the pipe body and secured to the pipe body.

In one embodiment, the polypropylene filament is hollow.

In one embodiment, the woven layer is woven from bamboo charcoal fibers and polypropylene filaments, and the sum of the number of bamboo charcoal fibers and the number of polypropylene filaments is greater than forty-eight.

In one embodiment, the pipe body is an axially expandable hose, and the woven layer is an accordion style fabric sleeve with pleats.

In one embodiment, the first joint assembly comprises a first connector inserted in the pipe body, a first retainer ring configured to fix the pipe body with the first connector and sleeved around the pipe body, and a first connection socket fixedly connected to one end of the first connector away from the pipe body and provided with internal threads.

In one embodiment, the first joint assembly further comprises a first sealing ring which is disposed in the first connection socket and abuts against the first connector.

In one embodiment, the water pipe further comprises a first sheath sleeved outside of the first joint assembly.

In one embodiment, the second joint assembly comprises a second connector inserted in the pipe body, a second retainer ring configured to fix the pipe body with the second connector and sleeved around the pipe body, and a second connection socket which is in threaded connection with one end of the second connector distally from the pipe body.

In one embodiment, the second joint assembly further comprises a second sealing ring which is disposed in the second connection socket and abuts against the second connector.

In one embodiment, the second joint assembly further comprises a ball valve disposed in the second connection socket and a valve switch connected with the ball valve through a screw.

In one embodiment, one end of the second connection socket distally from the pipe body is provided with external threads.

In one embodiment, the water pipe further comprises a second sheath sleeved outside of the second joint assembly.

The woven layer, which is sleeved around the pipe body and is not in connection with the pipe body, includes bamboo charcoal fibers and polypropylene filaments. Bamboo charcoal fibers have the functions of resisting bacteria and removing peculiar smell, and can effectively prevent the generation of bacteria on the water pipe and the emission of peculiar smell when the water pipe is used in humid outdoor environments. The safety and health of using the water pipe are effectively improved, and further improving the use experience of the water pipe. Moreover, polypropylene is a kind of high-strength, degradable and environment-friendly material, which will not adversely substantially affect the environment while ensuring the strength of the woven layer.

BRIEF DESCRIPTION OF THE DRAWINGS

In order to make the technical solutions in the embodiments of the present application clearer, the accompanying drawings to be used in the embodiments and the description of the prior art will be briefly introduced below, it is apparent that the drawings in the following description are merely some embodiments of the present application and that other drawings may be obtained by those skilled in the field without departing from the inventive nature of the application.

Figure 1:
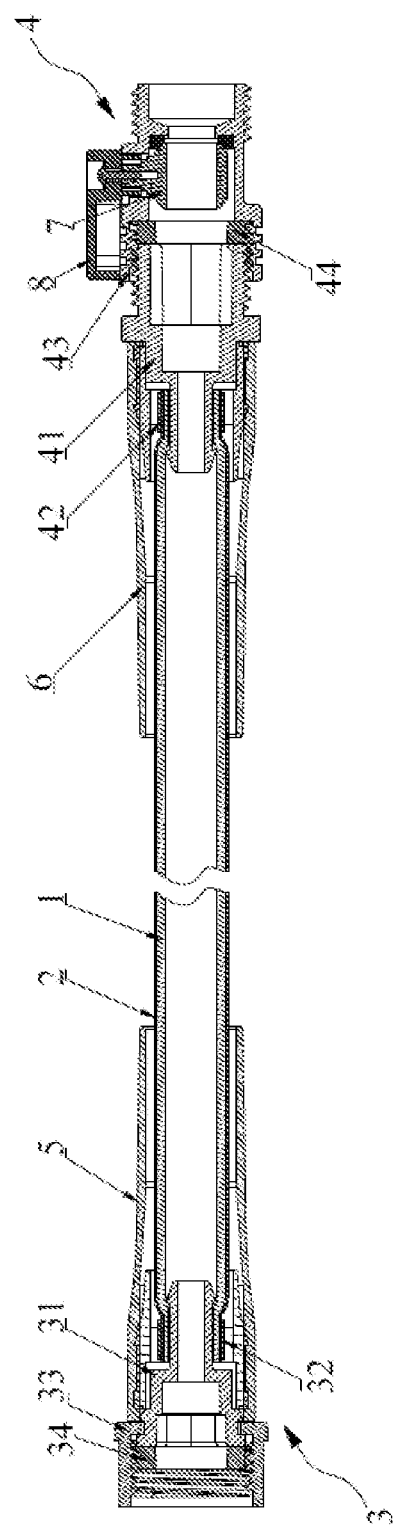
FIG. 1 is a structural schematic view of a water pipe according to one embodiment of the present application.

The drawings are marked accordingly as follows:

| | | |
|---|---|---|
| 1. pipe body | 2. woven layer | 3. first joint assembly |
| 31. first connector | 32. first retainer ring | 33. first connection socket |
| 34. first sealing ring | 4.second joint assembly | 41. second connector |
| 42. second retainer ring | 43. second connection socket | 44. second sealing ring |
| 5. first sheath | 6. second sheath | 7. ball valve |
| 8. valve switch | | |

DETAILED DESCRIPTION OF THE EMBODIMENTS

In order to make the technical problems to be solved, technical solutions, and beneficial effects of the present application clearer and more understandable, the present application will be further described in detail hereinafter with reference to the accompanying drawings and embodiments. It should be understood that the embodiments described herein are only intended to illustrate but not to limit the present application.

It is noted that when a component is referred to as being "fixed to" or "disposed on" another component, it can be directly or indirectly on the other component. When a component is referred to as being "connected to" another component, it can be directly or indirectly connected to the other component.

It should be understood that, "length", "width", "upper", "lower", "front", "back", "left" and "right", "vertical", "horizontal", "top", "bottom", "inside", "outside" and other terms indicating the orientation or positional relationship are based on orientation or positional relationship shown in the drawings, only for the purpose of facilitating the description of the application and simplifying the description, instead of indicating or implying that the indicated device or component must have a specific orientation and constructed and operated in a particular orientation, and therefore it cannot be construed as limiting the application.

In addition, the terms "first" and "second" are for illustrative purposes only and should not be construed as indicating or implying a relative importance or implicitly indicating the quantity of technical features indicated. Therefore, a feature that defines "first" and "second" may expressly or implicitly include one or more of the features. In the description of the present application, "multiple" means two or more than two, unless otherwise specifically defined.

Figure 2:
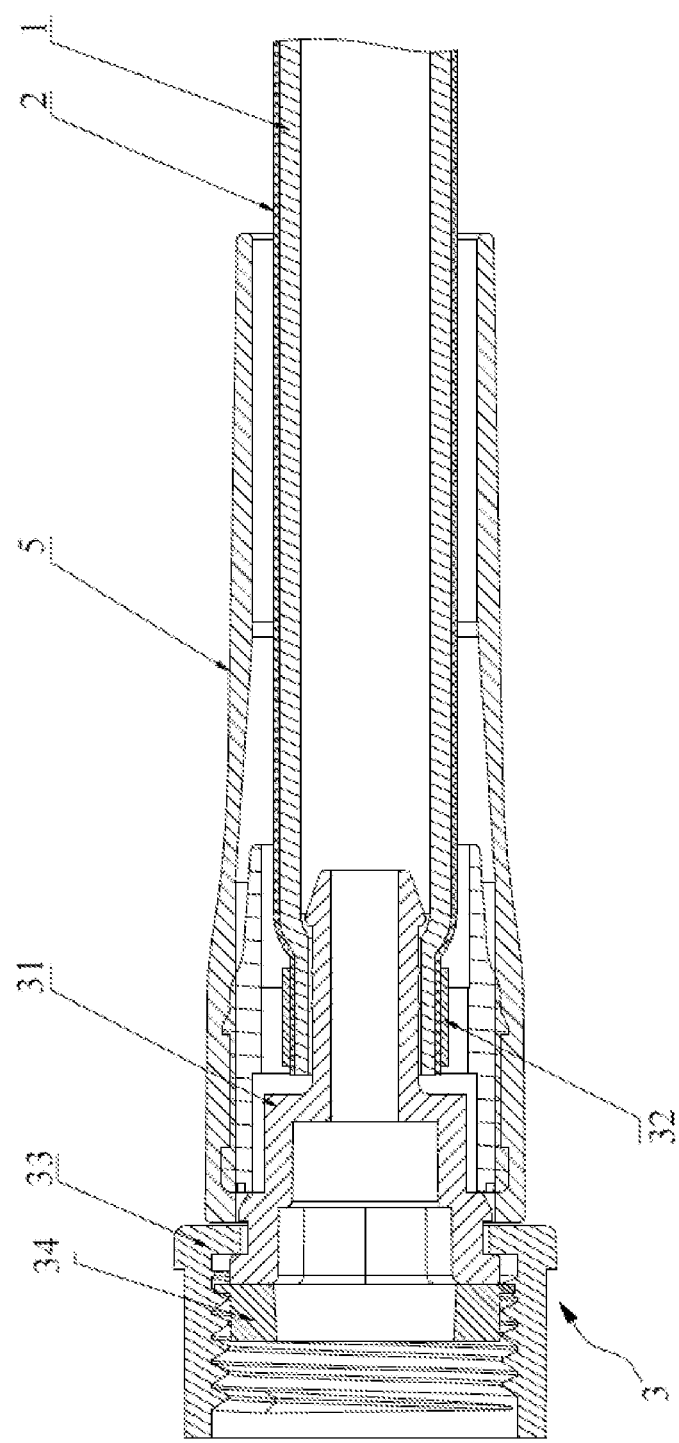
FIG. 2 is a structural schematic view of a first joint assembly according to one embodiment of the present application.
Figure 3:
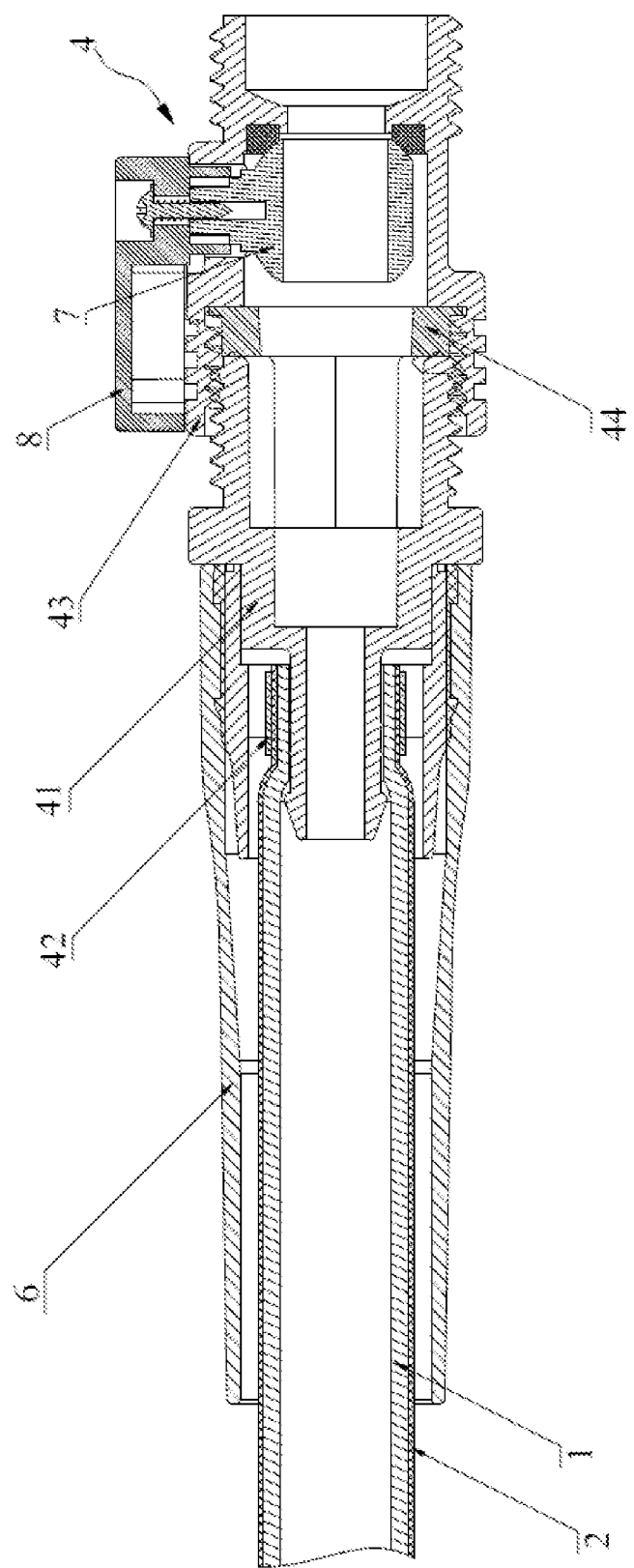
FIG. 3 is a structural schematic view of a second joint assembly according to one embodiment of the present application.

Please refer to FIG. 1 to FIG. 3. The water pipe provided by the present application is illustrated. The water pipe comprises a pipe body 1, a woven layer 2 sleeved around the pipe body 1, a first joint assembly 3 arranged at one end of the pipe body 1 and secured to the pipe body 1, and a second joint assembly 4 arranged at anther end of the pipe body 1 and secured to the pipe body 1; the woven layer 2 includes bamboo charcoal fibers and polypropylene filaments.

In the embodiments of the present application, the pipe body 1 is used for the passage of water flow, the woven layer 2 is sleeved around the pipe body 1 and is not connected with the pipe body 1, and the woven layer 2 includes bamboo charcoal fibers and polypropylene filaments. Bamboo charcoal fibers have the functions of resisting bacteria and removing peculiar smell and can effectively prevent the generation of bacteria on the water pipe and the emission of peculiar smell when the water pipe is used in humid outdoor environments. The safety and health of using the water pipe are effectively improved, and further improving the use experience of the water pipe. Moreover, polypropylene is a high-strength, degradable and environment-friendly material, which will not adversely and substantially affect the environment while ensuring the strength of the woven layer 2. Of course, in the embodiments of the present application, the above-mentioned bamboo charcoal fibers can also be replaced by bamboo charcoal particles.

Further, as one embodiment of the water pipe according to the present application, the polypropylene filament is hollow. Specifically, polypropylene fibers are arranged in a hollow shape, the weight of the woven layer 2 is effectively reduced, and the material for producing polypropylene fibers is also saved.

Further, as one embodiment of the water pipe according to the present application, the woven layer 2 is woven from bamboo charcoal fibers and polypropylene filaments, and the sum of the number of bamboo charcoal fibers and the number of polypropylene filaments is greater than forty-eight. Specifically, the woven layer 2 is woven from bamboo charcoal fibers and polypropylene filaments in warp and weft knitting. The number of bamboo charcoal fibers and polypropylene fibers is set to be greater than forty-eight, further increasing the strength of the woven layer 2.

Further, as one embodiment of the water pipe according to the present application, the pipe body 1 is an axially expandable hose, and the woven layer 2 is an accordion style fabric sleeve with pleats. Specifically, the woven layer 2 and the pipe body 1 are not fixed to each other, thus when the pipe body 1 is stretchable and retractable along the axial direction thereof, the accordion-style-fabric-sleeve-like woven layer 2 with pleats can also adapt the stretch and retraction of the pipe body 1 through its own stretch and retraction so as to cover the pipe body 1 during the process of stretch and retraction of the pipe body 1.

Further, please refer to FIG. 2, as one embodiment of the water pipe according to the present application, the first joint assembly 3 comprises a first connector 31 inserted in the pipe body 1, a first retainer ring 32 configured to fix the pipe body 1 with the first connector 31 and sleeved around the pipe body 1, a first connection socket 33 which is secured to one end of the first connector 31 distally from the pipe body 1 and is provided with internal threads, and a first sealing ring 34 which is disposed in the first connection socket 33 and abuts against the first connector 31. Specifically, the first joint assembly 3 is configured to connect to an external water supply equipment; a part of the structure of the first connector 31 is configured to insert in the pipe body 1, and the first connector 31 and pipe body 1 are secured through the first retainer ring 32. A portion of the first connector 31, which is exposed outside the pipe body 1, is configured to fix with the first connection socket 33, and the first connection socket 33 is configured to directly connect with the water supply device. When the first connection socket 33 is connected with the water supply device, the first sealing ring 34 can be tightly abutted between the first connector 31 and the first connection socket 33 so as to realize sealing. The water of the water supply device enters the first connection socket 33 and flows through the first connector 31 and then enters the pipe body 1.

Further, please refer to FIG. 1 and FIG. 2, as one embodiment of the water pipe according to the present application, the water pipe further comprises a first sheath 5 sleeved outside of the first joint assembly 3. Specifically, in order to ensure the stability of the connection of the whole first joint assembly 3 and the pipe body 1, and to prevent the use of the water pipe from being influenced due to the breakage in the connection between the first joint assembly 3 and the pipe body 1, the first sheath 5 is sleeved outside of the connection between the joint assembly 3 and the pipe body 1, so as to avoid affecting the stability of the connection between the first joint assembly 3 and the pipe body 1 during use.

Further, please refer to FIG. 3, as one embodiment of the water pipe according to the present application, the second joint assembly 4 comprises a second connector 41 inserted in the pipe body 1, a second retainer ring 42 configured to fix the pipe body 1 to the second connector 41 and sleeved around the pipe body 1, a second connection socket 43 which is in threaded connection with one end of the second connector 41 distally from the pipe body 1, and a second sealing ring 44 which is disposed in the second connection socket 43 and abuts against the second connector 41. Specifically, the second joint assembly 4 is configured to connect with the first joint assembly 3 of another water pipe or a water device, a part of the structure of the second connector 41 is configured to insert in the pipe body 1, and the second connector 41 and pipe body 1 are secured through the second retainer ring 42. A portion of the second connector 41, which is exposed outside the pipe body 1, is configured to fix with the second connection socket 43, and the second connection socket 43 is configured to directly connect with the water supply device. When the first connection socket 33 is connected with the first joint assembly 3 of another water pipe or a water device, the second sealing ring 44 can be tightly abutted between the second connector 41 and the second connection socket 43 so as to realize sealing. The water in the pipe body 1 flows through the second connector 41 and enters the second connection socket 43 and then flows to the first joint assembly 3 of another pipe or the water device.

Further, please refer to FIG. 1 and FIG. 3, as one embodiment of the water pipe according to the present application, the second joint assembly 4 further comprises a ball valve 7 disposed in the second connection socket 43 and a valve switch 8 connected with the ball valve 7 through a screw. Specifically, the ball valve 7 is controlled through the valve switch 8, and then the passing of the water flow of the water pipe is realized.

Further, please refer to FIG. 1 and FIG. 3, as one embodiment of the water pipe according to the present application, one end of the second connection socket 43 distally from the pipe body 1 is provided with external threads. Specifically, the external threads of the second connection socket 43 is configured to cooperate with the internal threads of the first connection socket 33 on the first joint assembly 3 of another water pipe.

Further, please refer to FIG. 1 and FIG. 3, as one embodiment of the water pipe according to the present application, the water pipe further comprises a second sheath 6 sleeved outside of the second joint assembly 4. Specifically, in order to ensure the stability of the connection of the whole second joint assembly 4 and the pipe body 1, and to prevent the use of the water pipe from being influenced due to the breakage in the connection between the second joint assembly 4 and the pipe body 1, the second sheath 6 is sleeved outside of the connection between the joint assembly 4 and the pipe body 1, so as to avoid affecting the stability of the connection between the second joint assembly 4 and the pipe body 1 during use.

The aforementioned embodiments are only preferred embodiments of the present application, and are not intended for limiting the present application. Any modification, equivalent replacement, improvement, and so on, which are made within the spirit and the principle of the present application, should be included in the protection scope of the present application.

What is claimed is:

1. A water pipe, comprising:
a pipe body;
a woven layer including bamboo charcoal fibers and polypropylene filaments, said woven layer being sleeved around the pipe body, wherein the polypropylene filaments are hollow;
a first joint assembly arranged at one end of the pipe body and secured to the pipe body; and
a second joint assembly arranged at another end of the pipe body and secured to the pipe body.

2. The water pipe according to claim 1, wherein the woven layer is woven from bamboo charcoal fibers and polypropylene filaments, and the sum of the number of bamboo charcoal fibers and the number of polypropylene filaments is greater than forty-eight.

3. The water pipe according to claim 1, wherein the pipe body is an axially expandable hose, and the woven layer is an accordion style fabric sleeve with pleats.

4. The water pipe according to claim 1, wherein the first joint assembly comprises a first connector inserted in the pipe body, a first retainer ring configured to fix the pipe body with the first connector and sleeved around the pipe body, and a first connection socket which is secured to one end of the first connector distally from the pipe body and is provided with internal threads.

5. The water pipe according to claim 4, wherein the first joint assembly further comprises a first sealing ring which is disposed in the first connection socket and abuts against the first connector.

6. The water pipe according to claim 1, wherein the water pipe further comprises a first sheath sleeved outside of the first joint assembly.

7. The water pipe according to claim 1, wherein the second joint assembly comprises a second connector inserted in the pipe body, a second retainer ring configured to fix the pipe body with the second connector and sleeved around the pipe body, and a second connection socket which is in threaded connection with one end of the second connector distally from the pipe body.

8. The water pipe according to claim 7, wherein the second joint assembly further comprises a second sealing ring which is disposed in the second connection socket and abuts against the second connector.

9. The water pipe according to claim 7, wherein the second joint assembly further comprises a ball valve disposed in the second connection socket and a valve switch connected with the ball valve through a screw.

10. The water pipe according to claim 7, wherein one end of the second connection socket distally from the pipe body is provided with external threads.

11. The water pipe according to claim 1, wherein the water pipe further comprises a second sheath sleeved outside of the second joint assembly.

* * * * *